Feb. 23, 1932.    C. E. ROSE    1,846,759

FILM PACK

Filed June 19, 1931    2 Sheets-Sheet 1

INVENTOR
Chester E. Rose
BY
ATTORNEY

Feb. 23, 1932.    C. E. ROSE    1,846,759
FILM PACK
Filed June 19, 1931    2 Sheets-Sheet 2
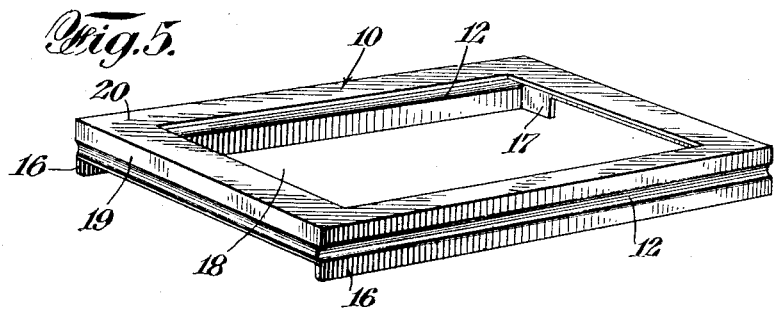
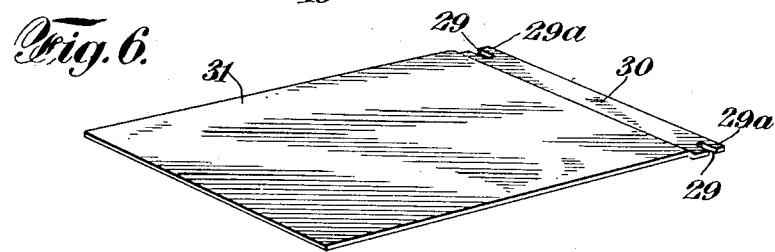
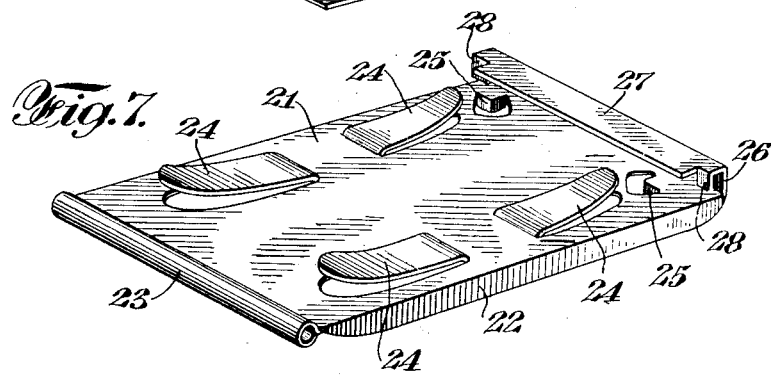
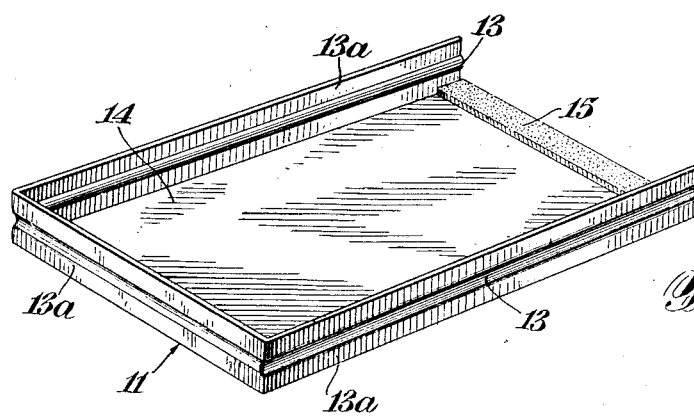
INVENTOR
Chester E. Rose
BY
ATTORNEY Patented Feb. 23, 1932

1,846,759

UNITED STATES PATENT OFFICE

CHESTER E. ROSE, OF PARLIN, NEW JERSEY, ASSIGNOR TO DU PONT FILM MANUFACTURING CORPORATION, OF NEW YORK, N. Y., A CORPORATION OF DELAWARE

FILM PACK

Application filed June 19, 1931. Serial No. 545,395.

This invention relates to film packs and more particularly to an improved sheet metal pack designed to accommodate high speed negative film such as panchromatic film.

One of the objects of the present invention is to provide a film pack whose construction and safe operation are materially simplified. A further object is to provide a film pack embodying an improved light seal. Another object is to provide a film pack whose movable parts are designed to prevent injury to the film during the operation of the pack. Additional and more specific objects will plainly appear from the detailed description presented herein.

To enable those skilled in the art to use my invention, I will as an illustration describe a preferred embodiment thereof with the understanding that modifications may be made without departing from its spirit and scope in its broader aspects.

In the accompanying drawings—

Figure 5 shows a perspective view of the front casing member.

Figure 6 shows a perspective view of the follower plate.

Figure 7 shows a perspective view of the partition member.

Figure 8 shows a perspective view of the rear casing member.

Figure 1:
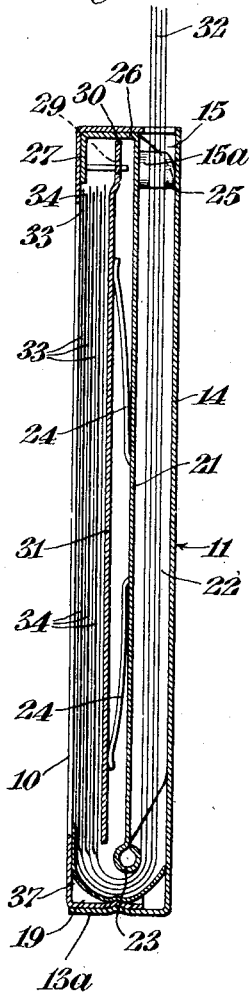
Figure 1 is a vertical cross sectional view of a side elevation of the assembled film pack taken on the line 1—1 in Figure 2.
Figure 2:
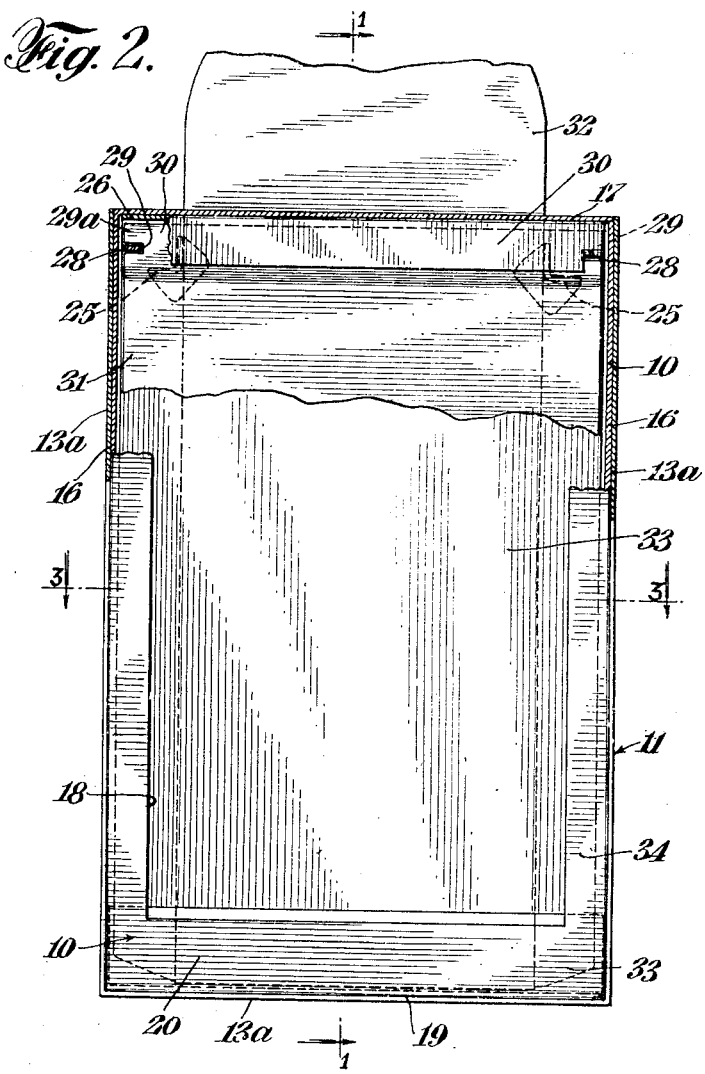
Figure 2 is a vertical sectional view of a front elevation of the assembled film pack showing portions of the front casing member, the film, and the paper backing broken away for clarity.

A preferred form of my improved film pack is made preferably of thin sheet metal and includes a partition member 21, a follower plate 31, a rear casing member 11 and a front casing member 10.

The partition member 21 shown in Fig. 7 is formed with the usual spring members 24 and with the usual beaded lower end 23. The upper end 26 of the partition member 21 is bent forwardly and downwardly so as to provide a lip 27 in a plane approximately parallel to the plane of the base of the partition 21. Corner portions of the lip 27 are bent rearwardly to form projections 28 which extend at approximately 90° to the plane of the base of the partition 21 and which are designed to permit adequate clearance between the ends of the projections 28 and the base of the partition 21. The side edges 22 of the partition member 21 are bent rearwardly so as to provide the usual lateral guides for the film 34. Angular projections are formed near the upper corner areas of the base of the partition 21 and are bent rearwardly so as to provide the usual guides 25 for the tabs 32 of the paper film backing 33.

The follower member 31 shown in Fig. 6 is formed with a slightly depressed lip 30 at its upper end. In each corner of the lip 30 are cut lateral slots 29 which form the lateral projections 29a.

The rear casing member 11 shown in Fig. 8 comprises a base 14 and the three wall members 13a having on their inner sides a continuous projecting ridge or shoulder 13. The usual felt or plush pad is shown at the open end 15 of the rear casing member 11.

The front casing member shown in Fig. 5 comprises the face 20 in which is cut the aperture 18. Joining the face 20 are the side walls 16 and the end walls 19 and 17. An opening is provided in the upper end wall 17 to allow the paper tabs 32 to extend therethrough. The side walls 16 and the lower end wall 19 are provided with a continuous groove adapted to interfit with the projecting ridge or shoulder 13 of the rear casing member 11.

Figure 3:
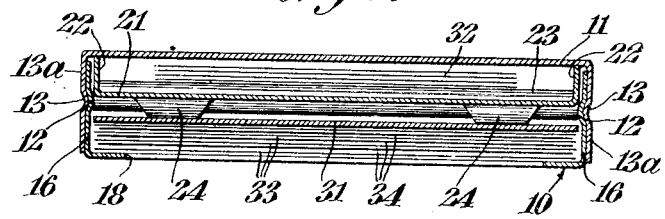
Figure 3 shows a horizontal cross sectional view of the assembled pack taken on the line 3—3 in Figure 2.
Figure 4:
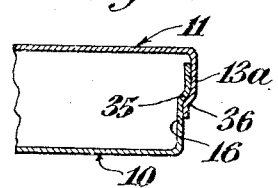
Figure 4 shows diagrammatically a cross sectional view of a modified form of the improved light seal.

A modified form of my improved light seal is shown in Fig. 4 wherein the shoulder construction 35 and 36 may be formed in the side walls of the casing members instead of the preferred ridge and groove construction previously described and shown in Fig. 3.

My improved film pack is assembled and operated as follows:

The follower plate 31 is placed in position by slipping the lip 30 under the projections 28 and through the clearance between the projections 28 and base of the partition 21 so that the projections 28 will engage the slots 29 causing the projections 29a to rest upon the projections 28 and to be suspended and supported thereby. The lip 27 will then fit over the depressed lip 30.

This provides an improved and certain engagement between the follower plate and the partition member that prevents any undue displacement of the follower plate as well as any material swinging motion thereof, which in prior packs tend to cause harmful rubbing or abrasive action on the film during the manipulation of the film pack and camera when in use, and particularly during the forward movement of the follower plate.

The films 34 are then assembled on top of the follower plate 31 with their backing papers and safety paper covers 33 in the usual manner. The manipulating tabs 32 are then folded around the guide 23 and laid between the projecting guides 25 on the partition member 21. The stacked ends of the films 34 and paper backings 33 are inserted between the lip 27 and the lip 30 and are held in that position by the pressure of the follower plate 31 against the lip 27 when actuated by the springs 24.

The front casing member 10 is then placed over this assembly so that the aperture 18 comes over the stack of films and backing papers and so that the manipulating tabs 32 will extend through the opening 17. The safety strip 37 is inserted at the bend of the stack as shown in Fig. 1.

With the casing members 10 and 11 in their relative positions as shown in Figs. 5 and 8 the lower end 19 of the front casing member 10 is inserted in the upper open end 15 of the rear casing member 11 so that the groove 12 engages the ridge 13. The front casing member 10 may then be slipped longitudinally into engagement with the rear casing member 11 so that the groove 12 completely interfits with the ridge 13 and thereby acts to hold the two members in positive engagement and at the same time affords an improved light seal for the protection of the film. The upper end 26 of the partition member 21 now acts to provide a light seal for the upper ends of the assembled casing members 10 and 11. On the rear side of the upper end of the partition member 21 is provided a felt or plush pad (not shown) which coacts with the pad at 15 to perfect the light seal at this point, and permits the manipulation of the paper tabs therethrough.

If it is desired to remove exposed films before the entire pack is used, this may be done in a safe light by longitudinally sliding the front casing member 10 upward until it projects a short distance out of the rear casing member 11. The safety paper cover 32 which will then be uppermost is lifted up slightly together with the exposed film 34 so that they will clear the guides 25. The exposed film 34 may then be withdrawn, but the safety paper cover 32 remains in place. The pack is then reclosed by simply sliding the two casing members together, and replacing them in the camera where the remainder of the films may subsequently be exposed. As the two telescoping casing members are never entirely disengaged during this operation, the contents of the pack are effectually held in place thereby and cannot become accidently disturbed, as is likely in prior packs. Furthermore, it should be noted that no locking clip is needed in my improved pack, to hold the casing members together as required in prior packs.

Having herein described a preferred embodiment of my invention, it is expressly stated that it is illustrative only and not limited to the materials, dimensions, and specific elements set forth, but comprises all the equivalents of the several cooperating features herein shown and described. Hence I desire to cover all modifications within the language or scope of any one or more of the appended claims.

What I claim as new and desire to secure by Letters Patent is:

1. An improved film pack adapted to accommodate a stack of unexposed films with their backing sheets and operating tabs, comprising in cooperative combination; a case composed of two longitudinally telescoping casing members, a partition member; and a follower plate adapted to be slideably suspended near both of its upper corner areas from the upper corner areas of said partition member.

2. An improved film pack adapted to accommodate a stack of unexposed films with their backing sheets and operating tabs, comprising in combination; a case composed of two longitudinally telescoping casing members having mutually interfitting walls light-sealed by means of a shoulderlike projection extending longitudinally along the said walls of one of said casing members; said projection being adapted to engage and interfit a complementary depression extending in a like manner along the like walls of the other of said casing members; a follower plate; and a partition member dividing said case into a storage chamber and an exposure chamber provided with an exposure aperture; the upper ends of said case and of said partition member coacting to provide a light seal therebetween that permits the manipulation of said tabs therethrough.

3. An improved film pack adapted to accommodate a stack of unexposed films with their backing sheets and operating tabs, comprising in combination; a case composed of two longitudinally telescoping casing members having mutually interfitting walls light-sealed by means of a substantially uninterrupted projecting ridge extending longitudinally along the said walls of one of said casing members; said ridge being adapted to engage and interfit a complementary groove extending in a like manner along the like walls of the other of said casing members; a partition member dividing said case into a storage chamber and an exposure chamber provided with an exposure aperture; the upper ends of said case and of said partition member coacting to provide a light seal therebetween that permits the manipulation of said tabs therethrough; and a follower plate adapted to be slideably suspended near both of its upper corner areas from the upper corner areas of said partition member.

4. An improved film pack made principally of sheet metal and adapted to accommodate a stack of unexposed films with their backing sheets and operating tabs, comprising in combination; a case composed of two longitudinally telescoping casing members having mutually interfitting walls light-sealed by means of a substantially uninterrupted projecting ridge extending longitudinally along the said walls of one of said casing members; said ridge being adapted to engage and interfit a complementary groove extending in a like manner along the like walls of the other of said casing members; a partition member dividing said case into a storage chamber and an exposure chamber provided with an exposure aperture; the upper ends of said partition member and said case coacting to provide a light seal therebetween that permits the manipulation of said tabs therethrough; and a follower plate adapted to be removably and slideably suspended near both of its upper corner areas from the upper corner areas of said partition member; the upper end of said partition member being provided with a downwardly projecting lip adapted to overlap the end of said stack of films and backing sheets and to limit the forwardly sliding motion of said follower plate.

In testimony whereof, I have signed my name to this specification this 18th day of May, 1931.

CHESTER E. ROSE.